United States Patent
Oh

[19]

[11] Patent Number: 5,901,274
[45] Date of Patent: May 4, 1999

[54] METHOD FOR ENLARGEMENT/REDUCTION OF IMAGE DATA IN DIGITAL IMAGE PROCESSING SYSTEM AND CIRCUIT ADOPTING THE SAME

[75] Inventor: Hyang-su Oh, Suwon, Rep. of Korea

[73] Assignee: Samsung Electronics Co. Ltd., Kyungki-do, Rep. of Korea

[21] Appl. No.: 08/760,256

[22] Filed: Dec. 5, 1996

Related U.S. Application Data

[63] Continuation-in-part of application No. 08/365,898, Dec. 29, 1994, abandoned.

[30] Foreign Application Priority Data

Apr. 30, 1994 [KR] Rep. of Korea .......................... 94-9550

[51] Int. Cl.⁶ .............................. H04N 1/393; G06K 9/42
[52] U.S. Cl. ......................... 395/102; 358/451; 382/298
[58] Field of Search ........................... 395/102; 358/451; 382/298, 299; 345/127, 128; 348/561, 581

[56] References Cited

U.S. PATENT DOCUMENTS

| | | | |
|---|---|---|---|
| 4,875,173 | 10/1989 | Nakajima | 382/298 |
| 5,029,017 | 7/1991 | Abe et al. | 358/451 |
| 5,191,623 | 3/1993 | Moriya | 382/298 |
| 5,335,296 | 8/1994 | Larkin et al. | 382/298 |
| 5,453,846 | 9/1995 | Tsao et al. | 358/448 |
| 5,535,007 | 7/1996 | Kim | 358/296 |

FOREIGN PATENT DOCUMENTS

| | | |
|---|---|---|
| 0177640 | 4/1986 | European Pat. Off. . |
| 2226472 | 6/1990 | United Kingdom . |

OTHER PUBLICATIONS

"Scaling Binary Images: Key To High-Quality Imaging Systems", Computer Technology Review, Issue 11, No. 16, Feb. 1992, pp. 109–113.

*Primary Examiner*—Edward L. Coles
*Assistant Examiner*—Joseph R. Pokrzywa
*Attorney, Agent, or Firm*—Leydig, Voit & Mayer

[57] ABSTRACT

An image data enlargement/reduction method for use in a digital image processing system, performs enlargement and reduction of image data by employing a small quantity of data from a look-up table while satisfying a large range of enlargement and reduction operations as requested by a user, with a simplified circuit structure. Enlargement/reduction data is calculated by a microprocessor so that the zooming ratio can be easily modified by a software change.

12 Claims, 12 Drawing Sheets

| 0. | 1. | 2. | 3. | 4. | 6. | 7. | 8. | 9. | 10. | 11. | 13. | 14. | 15. | 16. | 17. | 19. | 20. | 21 | 22. |
| 23. | 24. | 26. | 27. | 28. | 29. | 30. | 31. | 33. | 34. | 35. | 36. | 37. | 39. | 40. | 41. | 42. | 43. | 44. | 46. |
| 47. | 48. | 49. | 50. | 51. | 53. | 54. | 55. | 56. | 57. | 59. | 60. | 61. | 62. | 63. | 64. | 66. | 67. | 68. | 69. |
| 70. | 71. | 72. | 74. | 75. | 76. | 77. | 79. | 80. | 81. | 82. | 83. | 84. | 86. | 87. | 88. | 89. | 90. | 91. | 93. |
| 94. | 95. | 96. | 97. | 99. | | | | | | | | | | | | | | | |

FIG. 6B

| 0. | 1. | 1. | 2. | 2. | 3. | 3. | 4. | 4. | 5. | 6. | 6. | 7. | 7. | 8. | 8. | 9. | 9. | 10. |
| 10. | 11. | 12. | 13. | 13. | 14. | 14. | 15. | 15. | 16. | 16. | 17. | 17. | 18. | 19. | 19. | 20. | 20. | 21. |
| 21. | 22. | 23. | 23. | 24. | 24. | 25. | 26. | 26. | 27. | 27. | 28. | 28. | 29. | 29. | 30. | 30. | 31. | 31. |
| 32. | 33. | 33. | 34. | 34. | 35. | 35. | 36. | 36. | 37. | 37. | 38. | 39. | 39. | 40. | 40. | 41. | 41. | 42. | 42. |
| 43. | 43. | 44. | 44. | 45. | 46. | 46. | 47. | 47. | 48. | 48. | 49. | 49. | 50. | 50. | 51. | 51. | 52. | 53. | 53. |
| 54. | 54. | 55. | 55. | 56. | 56. | 57. | 57. | 58. | 59. | 59. | 60. | 60. | 61. | 61. | 62. | 62. | 63. | 63. | 64 |
| 64. | 65. | 66. | 66. | 67. | 67. | 68. | 68. | 69. | 69. | 70. | 70. | 71. | 71. | 72. | 72. | 73. | 74. | 74. | 75. |
| 75. | 76. | 76. | 77. | 77. | 78. | 79. | 79. | 80. | 80. | 81. | 81. | 82. | 82. | 83. | 83. | 84. | 84. | 85. | 86. |
| 86. | 87. | 87. | 88. | 88. | 89. | 89. | 90. | 90. | 91. | 91. | 92. | 93. | 93. | 94. | 94. | 95. | 95. | 96. | 96. |
| 97. | 97. | 98. | 99. | 99. | | | | | | | | | | | | | | | |

METHOD FOR ENLARGEMENT/ REDUCTION OF IMAGE DATA IN DIGITAL IMAGE PROCESSING SYSTEM AND CIRCUIT ADOPTING THE SAME

This disclosure is a continuation-in-part of patent application Ser. No. 08/365,898, filed Dec. 29, 1994 abandoned.

BACKGROUND OF THE INVENTION

The present invention relates to a method for enlargement/reduction of image data in a digital image processing system, and more particularly, to a method for enlargement/reduction of input image data according to an arbitrary enlargement and reduction rate designated by a user.

Generally, digital image processing systems, for example, a digital copier or facsimile that converts an image into an electrical signal and processes the result by employing a photoelectric device (i.e., an image sensor such as a charge-coupled device), require a function for enlarging or reducing an original size image, in other words, a rate-converting function or an enlargement/reduction function. In order to satisfy such a requirement, an enlargement/reduction function is realized in a conventional method in which a regulated copy ratio (e.g., zooming), even in lot units for standard-sized documents, is made possible.

Figure 1:
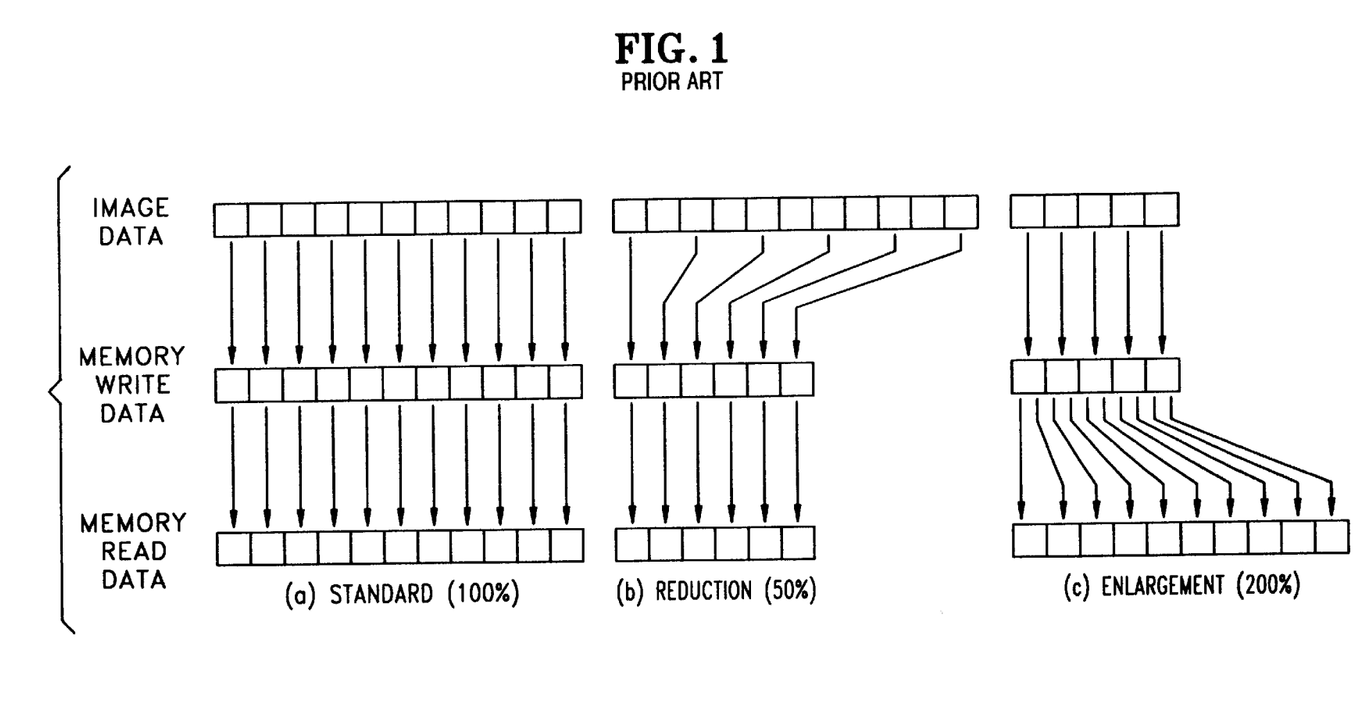
FIG. 1 illustrates the concept of a conventional image data enlargement/reduction method.

A technique applied for the conventional enlargement and reduction operations as above is illustrated in FIG. 1. Here, the pulse rate of an input (write) clock is controlled to correspond to a zooming ratio when image data is written into an image memory, for example, a line memory for storing the image data in units of one line of the main scanning direction, by employing a sync signal of the image data, and the pulse rate of an output (read) clock is controlled to correspond to a zooming ratio when the image data is read out from the image memory. In other words, when an image is to be doubled in size, the image data input at the image sync signal rate is written into an image memory and the same image data is read out from the image memory for two image sync signal pulses, to thereby output an image whose size is twice the original. Meanwhile, when an image is to be halved in size, alternating image data is written into the image memory every two image sync signal pulses and the image is read out from the image memory at the image sync signal rate, to thereby output an image whose size is half the original. (A more detailed method is disclosed in Japanese Laid-open Publication No. sho59-39158.)

Enlargement (115% reproduction) and reduction (85% reproduction) operations performed according to the above technique are exemplified in the following Tables 1 and 2, respectively, where P is a value used in connection with zooming ratio, K is an integer value and R is the zooming ratio.

TABLE 1

| number of input pixels | data value P + R | data value P | data value K | number of output pixels |
| --- | --- | --- | --- | --- |
| 1 | 1.15 | 0.00 | 1 | 1 |
| 2 | 1.30 | 0.15 | 1 | 2 |
| 3 | 1.45 | 0.30 | 1 | 3 |
| 4 | 1.60 | 0.45 | 1 | 4 |
| 5 | 1.75 | 0.60 | 1 | 5 |
| 6 | 1.90 | 0.75 | 1 | 6 |
| 7 | 2.05 | 0.90 | 2 | 7, 8 |
| 8 | 1.20 | 0.05 | 1 | 9 |

TABLE 1-continued

| number of input pixels | data value P + R | data value P | data value K | number of output pixels |
| --- | --- | --- | --- | --- |
| 9 | 1.35 | 0.20 | 1 | 10 |
| 10 | 1.50 | 0.35 | 1 | 11 |
| 11 | 1.65 | 0.50 | 1 | 12 |
| 12 | 1.80 | 0.65 | 1 | 13 |
| 13 | 1.95 | 0.80 | 1 | 14 |
| 14 | 2.10 | 0.95 | 2 | 15, 16 |
| 15 | 1.25 | 0.10 | 1 | 17 |
| 16 | 1.40 | 0.25 | 1 | 18 |
| 17 | 1.55 | 0.40 | 1 | 19 |
| 18 | 1.70 | 0.55 | 1 | 20 |
| 19 | 1.85 | 0.70 | 1 | 21 |
| 20 | 2.00 | 0.85 | 2 | 22, 23 |
| 21 | 1.15 | 0.00 | 1 | 24 |
| 22 | 1.30 | 0.15 | 1 | 25 |
| 23 | 1.45 | 0.30 | 1 | 26 |
| . | . | . | . | . |
| . | . | . | . | . |
| . | . | . | . | . |

TABLE 2

| number of input pixels | data value P + R | data value P | data value K | number of output pixels |
| --- | --- | --- | --- | --- |
| 1 | 0.85 | 0.00 | 0 | |
| 2 | 1.70 | 0.85 | 1 | 1 |
| 3 | 1.55 | 0.70 | 1 | 2 |
| 4 | 1.40 | 0.55 | 1 | 3 |
| 5 | 1.25 | 0.40 | 1 | 4 |
| 6 | 1.10 | 0.25 | 1 | 5 |
| 7 | 0.95 | 0.10 | 0 | |
| 8 | 1.80 | 0.95 | 1 | 6 |
| 9 | 1.65 | 0.80 | 1 | 7 |
| 10 | 1.50 | 0.65 | 1 | 8 |
| 11 | 1.35 | 0.50 | 1 | 9 |
| 12 | 1.20 | 0.35 | 1 | 10 |
| 13 | 1.05 | 0.20 | 1 | 11 |
| 14 | 0.90 | 0.05 | 0 | |
| 15 | 1.75 | 0.90 | 1 | 12 |
| 16 | 1.60 | 0.75 | 1 | 13 |
| 17 | 1.45 | 0.60 | 1 | 14 |
| 18 | 1.30 | 0.45 | 1 | 15 |
| 19 | 1.15 | 0.30 | 1 | 16 |
| 20 | 1.00 | 0.15 | 1 | 17 |
| 21 | 0.85 | 0.00 | 0 | |
| 22 | 1.70 | 0.85 | 1 | 18 |
| 23 | 1.55 | 0.70 | 1 | 19 |
| . | . | . | . | . |
| . | . | . | . | . |
| . | . | . | . | . |

In the above tables, a zooming ratio (R) is sequentially added to the number of input pixels, and the zooming ratio (R) is accumulated again with respect to the decimal value of the accumulated values, and an integer portion (K) of the accumulated values is examined.

In the operation state of Table 1, the zooming ratio (R) is 1.15. Here, if the examined integer portion (K) is above two, the next pixel data value is added to the input pixel data value, to thereby perform an enlargement corresponding to the zooming ratio (R).

In the operation state of table 2, the zooming ratio (R) is 0.85. Here, if the examined integer portion (K) is less than one, the pixel data is not output and the next pixel data value is output, to thereby perform an reduction corresponding to the zooming ratio (R).

However, the circuit for implementing such an enlargement/reduction method is very complicated, and controlling the timing for high-speed processing is difficult. In addition, the circuit is costly and the range of the enlargement/reduction ratio cannot be easily extended or otherwise modified.

Figure 2A:
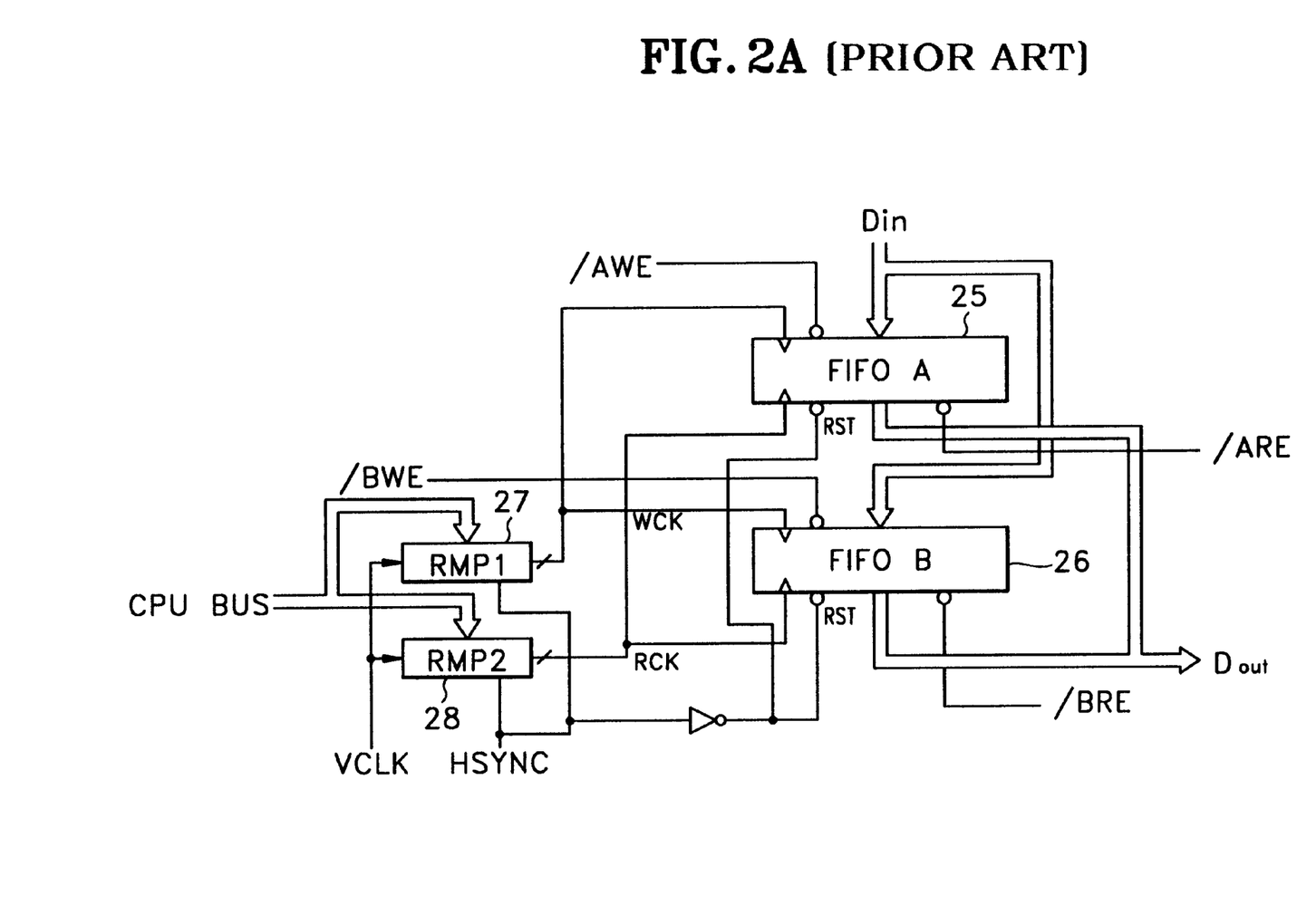
FIG. 2A to FIG. 2D illustrate conventional image data enlargement/reduction circuits and the operational waveforms thereof.
Figure 2B:
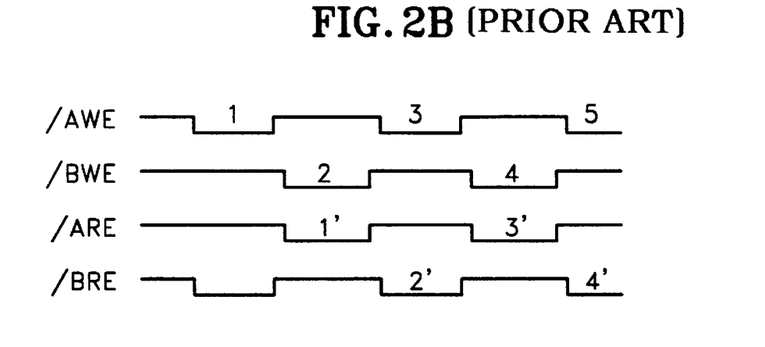
Figure 2C:
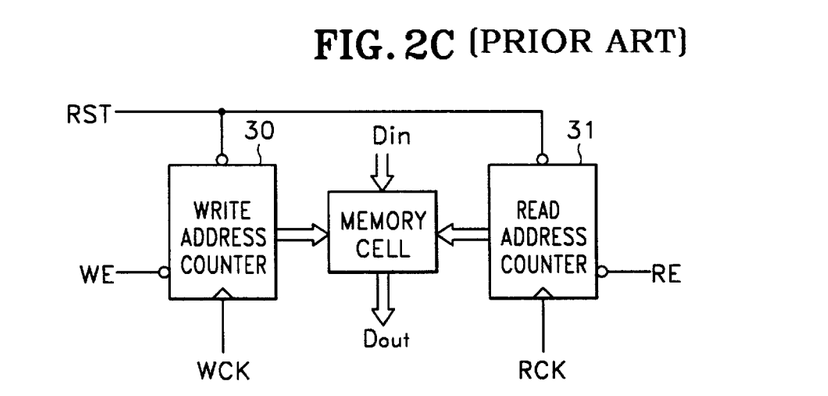
Figure 2D:
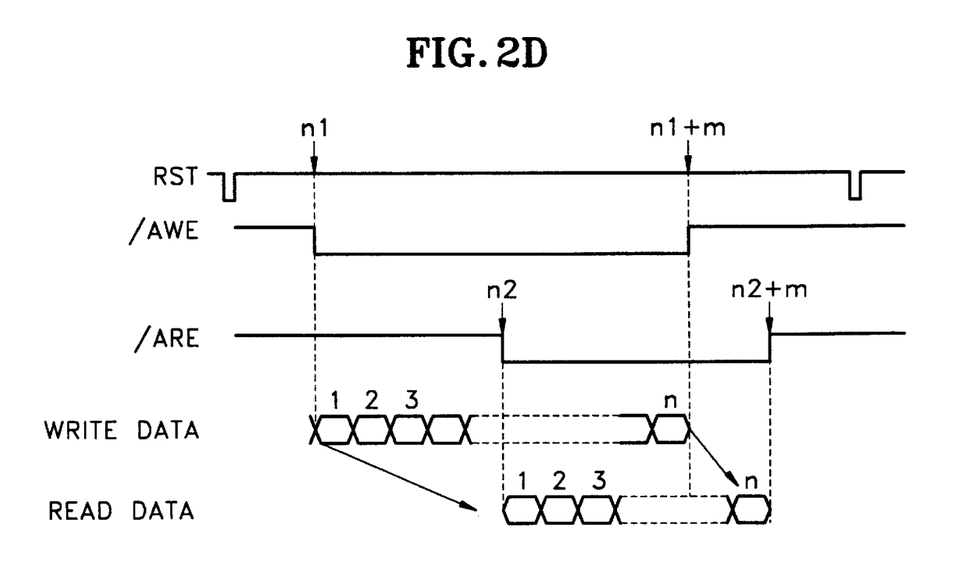

Another conventional technique is disclosed in Japanese Laid-open Publication No. hei2-132963, which is shown in FIG. 2A to FIG. 2D. Referring to FIG. 2A, reference numerals 25 and 26 denote FIFO memories A and B each having a capacity of one line of the main scanning direction, for example, 4752 pixels (16 pels/mm×297 mm; i.e., length of A4-sized paper). As shown in FIG. 2B, a memory write operation is performed when write enable signals /AWE and /BWE are low, and a memory read operation is performed when read enable signals /ARE and /BRE are low. In addition, the output of FIFO A is at a high impedance state when its read enable signal (/ARE) is high, and the output of FIFO B is at a high impedance state when its read enable signal (/BRE) is high. Thus, the respective outputs of FIFO A and FIFO B are output in a wired-OR state ($D_{OUT}$). In FIFO memories 25 and 26, an internal pointer proceeds in accordance with a write address counter and a read address counter which are operated by write clock WCK and read clock RCK, respectively, as shown in FIG. 2C. Therefore, the input image data is reduced when, with the sync signal VCLK of the image data (Din) which is divided by a rate multiplier (RMP1) 27, is applied to the write clock port of write address memory 30 and the sync signal VCLK, which is similarly divided by a rate multiplier (RMP2) 28, is applied to the read clock port of read address memory 31. Conversely, the input image is enlarged if the applied clock signals are reversed. Thus, FIFOs A and B alternately perform read and write operations. Meanwhile, a write address counter 30 and a read address counter 31 of FIFO memories 25 and 26 are structured such that counting is performed by a clock for the section where enable signals (WE and RE) are low, and are initialized (reset) upon a logic "low" state of a reset signal RST. For example, as shown in FIG. 2D, after an RST pulse (the inverted sync signal /HSYNC of main direction scanning) is input, pixel data from pixel n1 to pixel n1+m is written during the logic "low" state of the write enable signals of FIFOs A and B (/AWE and /BWE). Then, pixel data from pixel n2 to pixel n2+m is read out during the logic "low" state of the read enable signals (/ARE and /BRE). As a result, the write data becomes the read data, as shown in FIG. 2D.

The above-described method controls an output sync signal of image data at the point of reading/writing the image data from/to a line memory so as to perform enlargement or reduction which can be achieved stably in 1% units. However, the circuitry for achieving such an enlargement/reduction operation (i.e., 1% units) is quite complex. Further, in order to perform enlargement and reduction over a greater range of zooming ratios (beyond, say, 25% to 400%), the hardware needs to be physically altered.

SUMMARY OF THE INVENTION

Accordingly, it is an object of the present invention to provide a method for the enlargement/reduction image data in a digital image processing system, for promptly outputting image data of the desired reproduction or reduction rate with reference to data stored in a look-up-table (LUT) having a small capacity, whenever a user changes a zooming ratio.

It is another object of the present invention to provide a circuit suitable for realizing the above method.

To accomplish the above first object, there is provided an image data enlargement/reduction method in a digital image processing system which comprises an LUT where a small quantity of data for use in enlargement/reduction is stored and a memory for use in enlargement/reduction, and which enlarges/reduces input image data in accordance with a user-designated zooming ratio, the method comprising the steps of: (a) dividing the user-designated zooming ratio by one and calculating the quotient and remainder thereof; (b) reducing image data with reference to the data stored in the LUT, if the quotient calculated in the step (a) is less than one; (c) enlarging image data with reference to the data stored in the LUT, if the quotient calculated in the step (a) is greater than one and the remainder thereof is not zero; (d) performing a simple enlargement process, if the quotient calculated in the step (a) is greater than one and the remainder thereof is zero; and (e) writing the enlargement/ reduction data calculated via the steps (a) to (d) into the memory.

To accomplish the above second object, there is provided an enlargement/reduction circuit for enlarging and reducing image data input to a digital image processing system and outputting an image corresponding to a user-designated zooming ratio, the circuit comprising: a first memory for storing an LUT for use in enlargement/reduction; a microprocessor for calculating enlargement/reduction data corresponding to the zooming ratio, using the LUT stored in the first memory; a second memory for temporarily storing, in the course of calculating the enlargement/reduction data by the microprocessor, the enlargement/reduction data of the LUT and enlargement/reduction data for an amount of one line calculated from the microprocessor; first and second line memories for storing the input image data to be enlarged/reduced, in units of one scanned line, respectively; a third memory for performing enlargement/reduction by employing the enlargement/reduction data stored in the second memory; a first counter for counting a sync signal of the image data in order to write the one scanned line units of the image data, into predetermined addresses of the first and second line memories; a second counter for counting the sync signal of the image data in order to output the data of the third memory as addresses of the first and second line memories, so that data can be written into the third memory by the microprocessor and so that enlargement/reduction can be performed with respect to the user-designated zooming ratio during a scanning operation; and a frequency divider for frequency-dividing a line sync signal such that the read and write operations of the first and second line memories can be performed alternately.

BRIEF DESCRIPTION OF THE DRAWINGS

The above objects and other advantages of the present invention will become more apparent by describing in detail a preferred embodiment thereof with reference to the attached drawings in which:

FIG. 5A to FIG. 5K are operational waveforms of various parts of the circuit shown in FIG. 4;

DETAILED DESCRIPTION OF THE INVENTION

The present invention will be explained in more detail with reference to the attached drawings.

Figure 3:
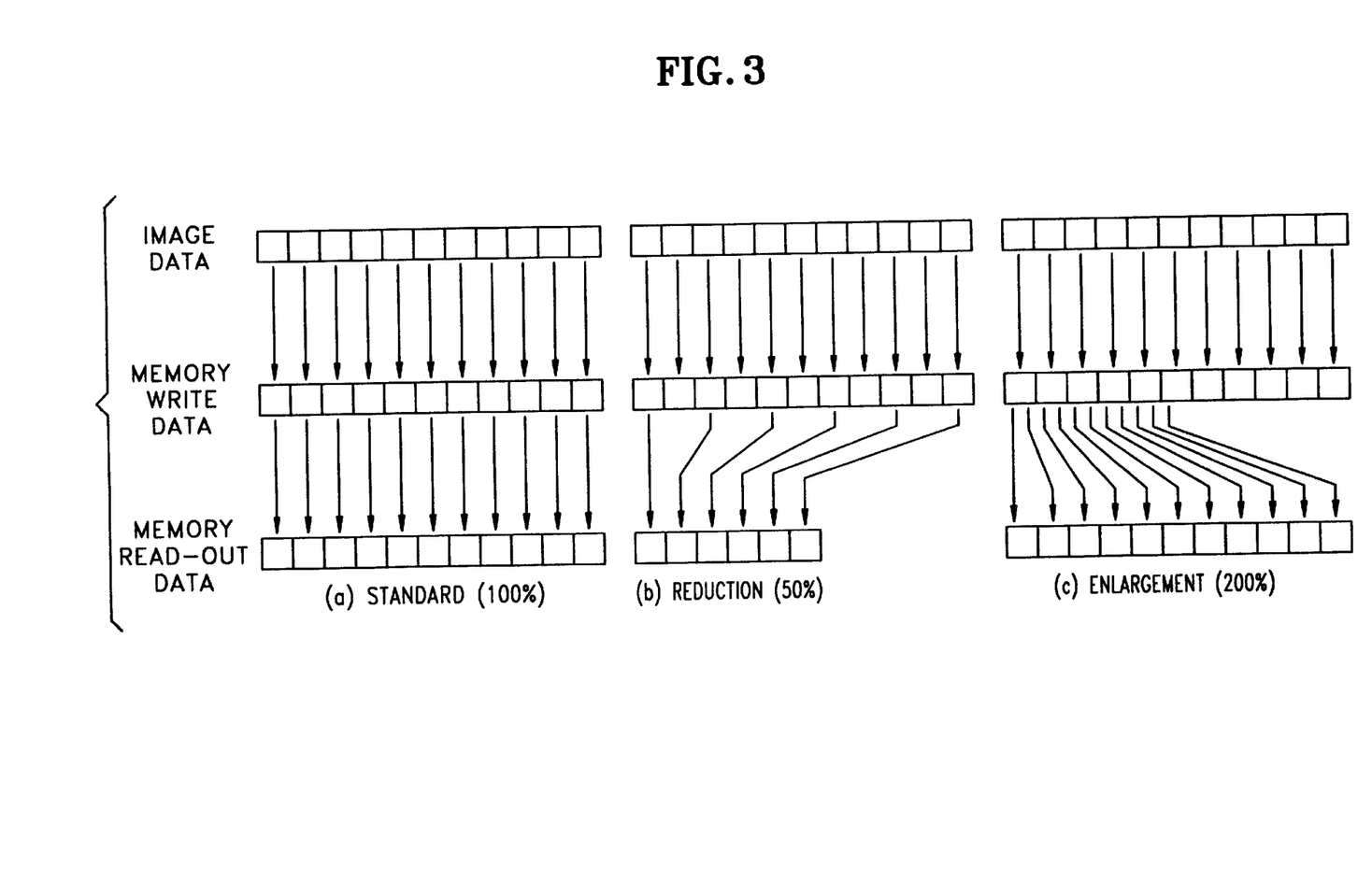
FIG. 3 illustrates the concept of image data enlargement and reduction according to the present invention.

FIG. 3 illustrates the concept of image data enlargement and reduction for use in a digital image processing system, according to the present invention. Referring to FIG. 3, it can be seen that, in the present invention, the line memory write data is the same regardless of zooming ratio, but the read data is controlled according to the zooming ratio, in contrast to the image data enlargement/reduction technique of FIG. 1.

Figure 4:
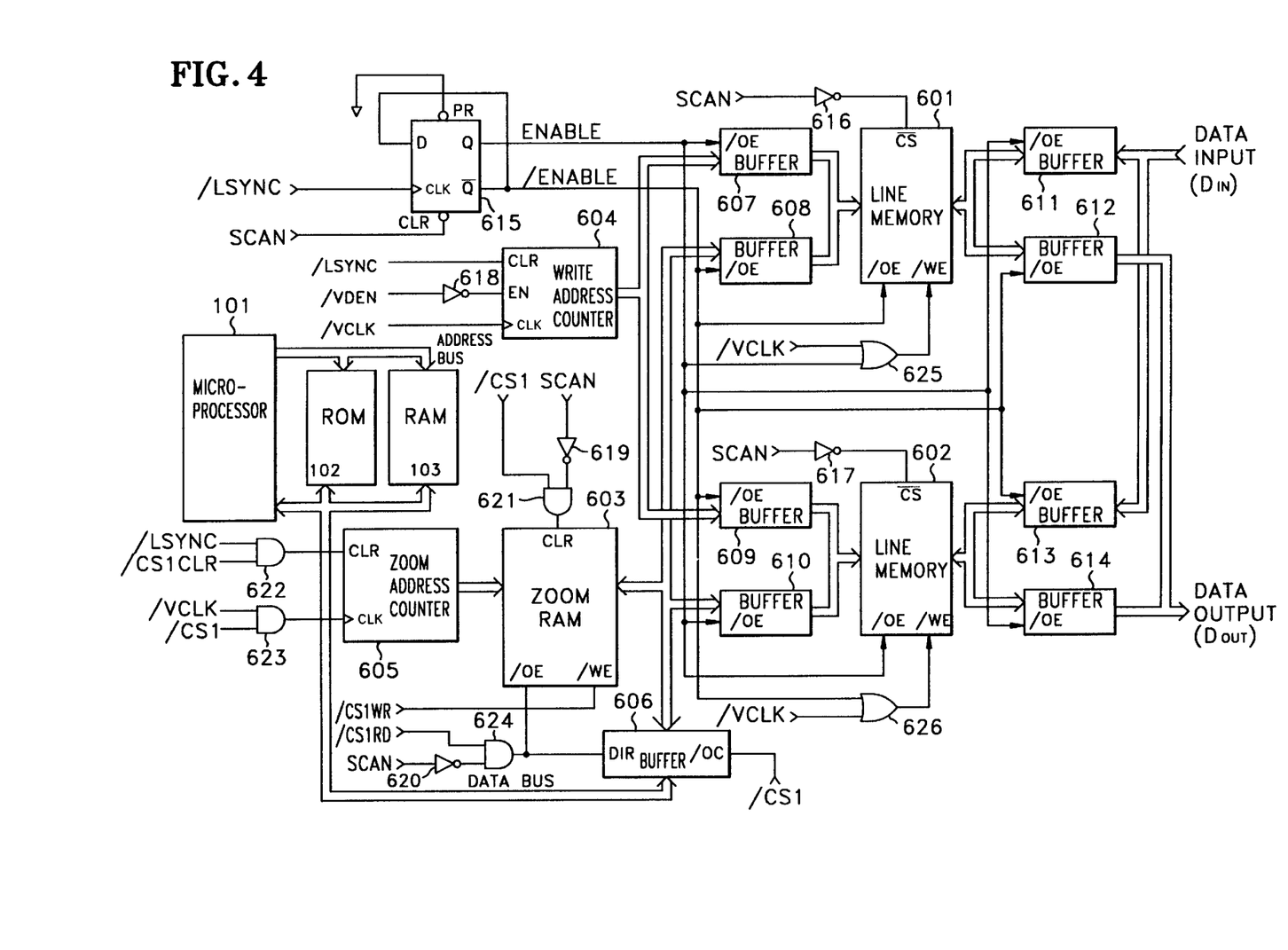
FIG. 4 is an image data enlargement/reduction processing circuit according to the present invention.

FIG. 4 is an image data enlargement/reduction circuit for use in a digital image processing system, according to the present invention. The circuit of FIG. 4 basically includes enlargement/reduction data calculating means for calculating enlargement/reduction data to be processed during a real copy operation by recognizing a zooming ratio defined by a user, and enlargement/reduction processing means for performing enlargement/reduction by employing the enlargement/reduction data calculated by the enlargement/reduction data calculating means.

The enlargement/reduction data calculating means comprises a first memory, for example, a ROM 102, for storing an enlargement/reduction LUT, a microprocessor 101 for calculating enlargement/reduction data by employing data of the LUT stored in ROM 102, and a second memory, for example, a RAM 103, for temporarily storing the LUT data for use in enlargement/reduction operations and the enlargement/reduction data calculated by microprocessor 101.

Meanwhile, the enlargement/reduction processing means comprises first and second line memories 601 and 602 for storing image data in units of one line in the main scanning direction in which, for example, the number of pixels is 4752 pels/line by assuming a resolution of 400 DPI (16 pels/mm) and A4-sized paper (length: 297 mm), a third memory, for example, a zoom RAM 603, for storing extended enlargement/reduction data by using enlargement/reduction data stored in RAM 103, a first counter, for example, a write address counter 604, for counting a sync signal. (VCLK) of the image data so that one line of image data in the main scanning direction, i.e., the image data output direction from a charge-coupled device, can be written into a predetermined address of first and second line memories 601 and 602, a second counter, for example, a zoom address counter 605, for counting the image data sync signal (VCLK) in order to output data of zoom RAM 603 as an address of first and second line memories 601 and 602 so that data can be written into zoom RAM 103 by microprocessor 101 or enlargement/reduction can be performed with respect to a predetermined zooming ratio during a scanning operation, and a frequency divider, for example, a D flip-flop 615, for dividing the frequency of a line sync signal so that the read/write operations of first and second line memories 601 and 602 can be performed alternately.

The enlargement/reduction processing means further comprises first buffer means, for example, buffers 607, 608, 609 and 610, which serves as a path for designating a write and read-out address to first and second memories 601 and 602, second buffer means, for example, buffers 611 and 613, which serves as a path for writing image data to be enlarged/reduced into first and second line memories 601 and 602, third buffer means, for example, buffers 612 and 614, which serves as a path for outputting the enlarged/reduced image data read out from first and second line memories 601 and 602, and fourth buffer means, for example, buffer 606, which serves as a path for enabling microprocessor 101 to read/write the data of zoom RAM 603.

In addition, the enlargement/reduction processing means further comprises first to fifth inverters 616 to 620, first to fourth AND gates 621 to 624, and first and second OR gates 625 and 626.

Figure 5A:
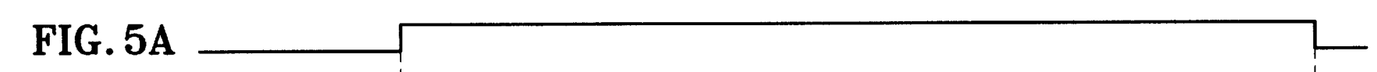
Figure 5B:
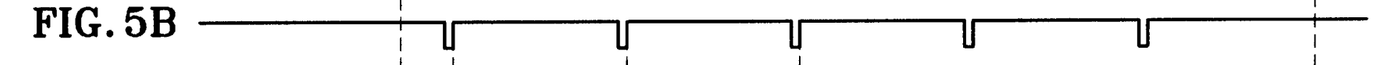
Figure 5C:
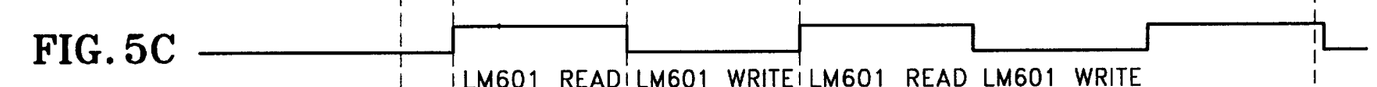
Figure 5D:
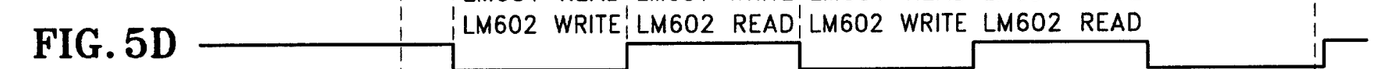
Figure 5E:
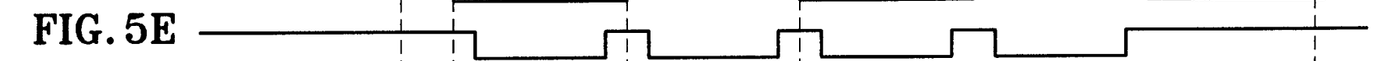
Figure 5F:
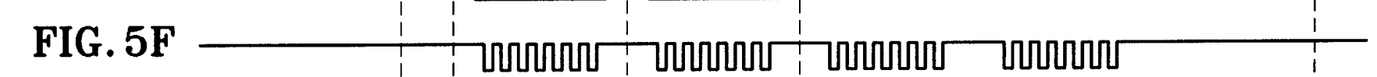
Figure 5G:
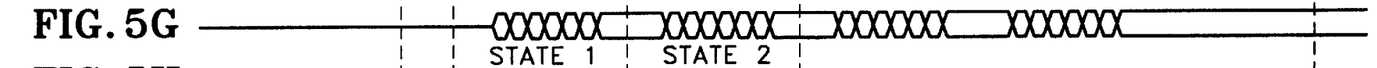
Figure 5H:
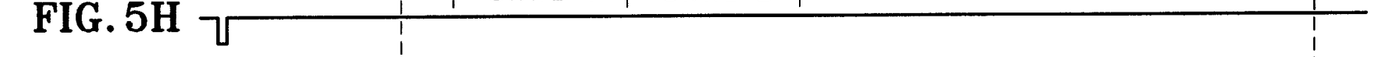
Figure 5I:
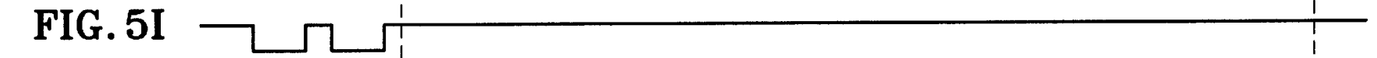
Figure 5J:
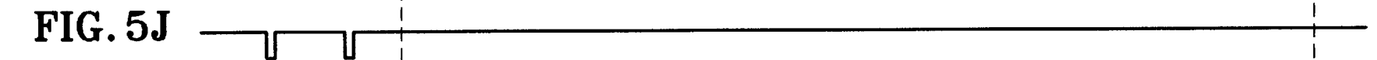
Figure 5K:
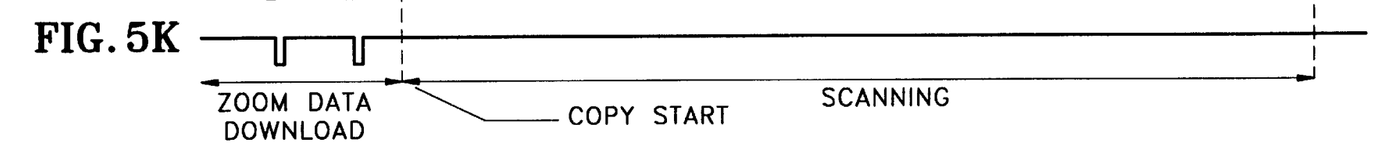

FIG. 5A to FIG. 5K illustrate the waveforms of various parts of the circuit shown in FIG. 4. FIG. 5A illustrates a scan signal applied to first, second, fourth and fifth inverters 616, 617, 619 and 620 and to the clear port of D flip-flop 615. FIG. 5B illustrates a line sync signal (/LSYNC) applied to second AND gate 622, the clock port of D flip-flop 615 and the clear port of write address counter 604. FIG. 5C illustrates an enable signal output from the Q port of D flip-flop 615. FIG. 5D illustrates an inverted enable signal output from the /Q port of D flip-flip 615. FIG. 5E illustrates an image data enable signal (/VDEN) applied to third inverter 618. FIG. 5F illustrates an inverted sync signal (/VCLK) applied to first and second OR gates 625 and 626, third AND gate 623, and the clock port of write address counter 604. FIG. 5G illustrates image data $D_{IN}$ input to buffers 611 and 613 to be enlarged or reduced. FIG. 5H illustrates the zoom RAM address clear signal (/CS1CLR) applied to second AND gate 622. FIG. 5I illustrates zoom RAM selecting signal (/CS1) applied to first and third AND gates 621 and 623 and an/octerminal of buffer 606. FIG. 5J illustrates the zoom RAM read signal (/CS1RD) applied to fourth AND gate 624, the output of which is applied to a terminal DIR of buffer 606 and the output (read) enable port of zoom RAM 603. FIG. 5K illustrates the zoom RAM write signal (/CS1WR) applied to the write enable port of zoom RAM 603.

Figure 6A:
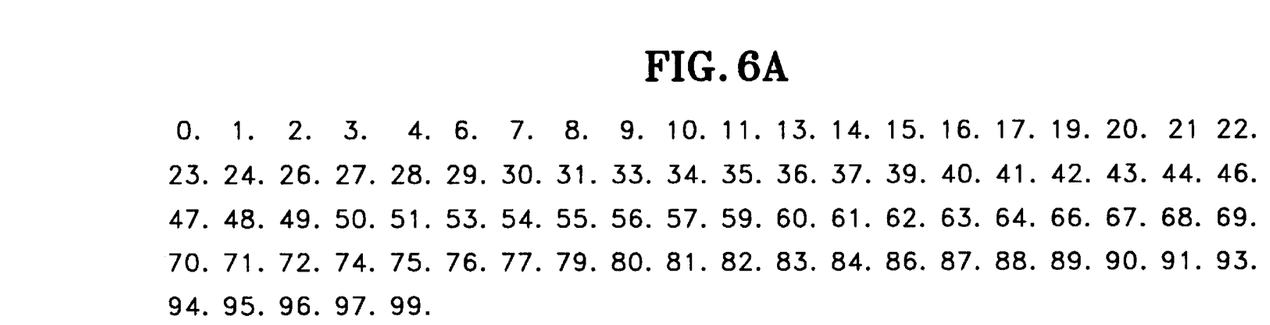
FIG. 6A shows an LUT for use in reduction.
Figure 6B:
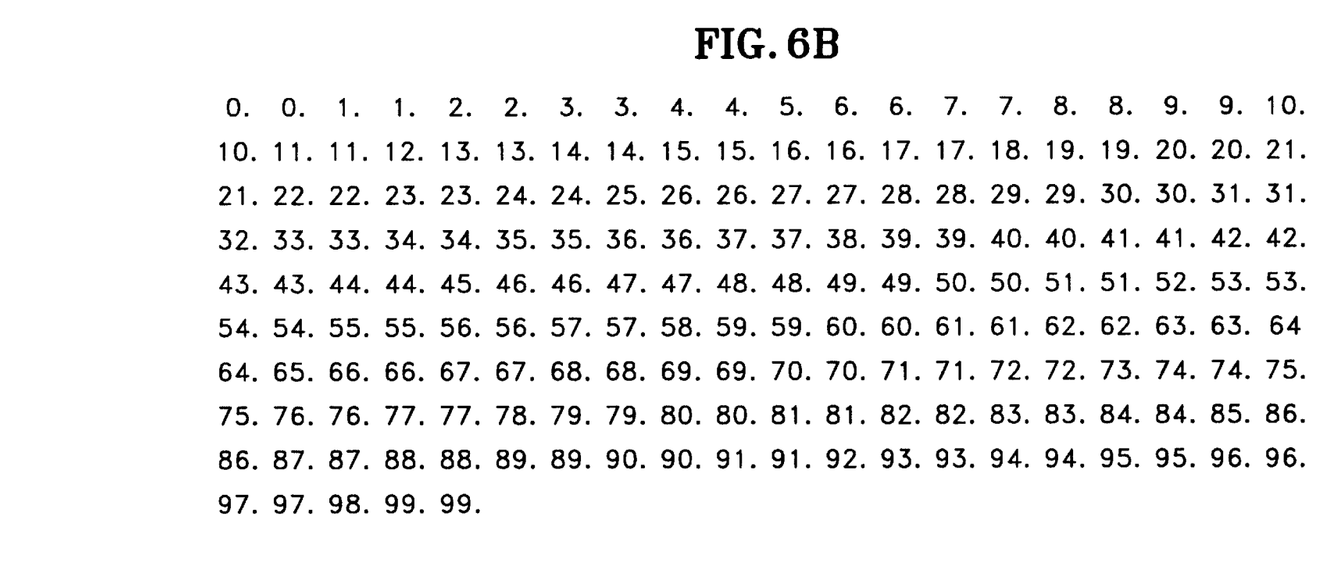
FIG. 6B shows enlargement data calculated using the LUT.

FIG. 6A shows an embodiment of an LUT for use in enlargement/reduction for the case where the zooming ratio is 85%. FIG. 6B shows part of the enlargement/reduction data calculated by microprocessor 101 for the case where zooming ratio is 185%.

Figure 7:
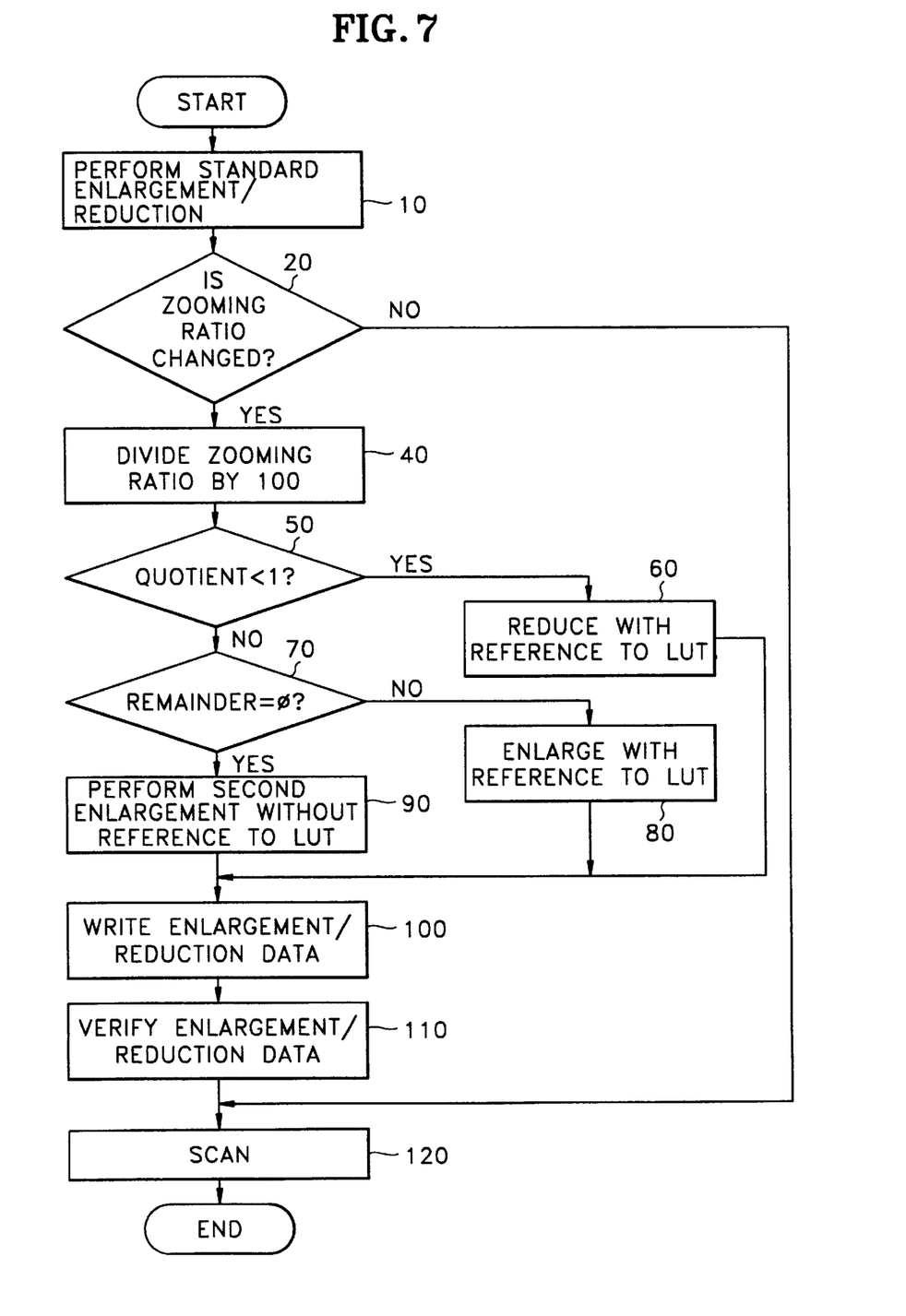
FIG. 7 is a flowchart showing the image data enlargement/reduction method of the present invention.

FIG. 7 is a flowchart for explaining image data enlargement/reduction processing method according to the present invention, for use in a digital image processing system. Step 10 is a standard enlargement/reduction processing step for performing a standard enlargement/reduction with respect to image data which is input when an initial operation is executed. Steps 20 and 40 are enlargement/reduction ratio dividing steps, performed if the zooming ratio is set by a user, for calculating the quotient and remainder by dividing the changed rate by 100. Steps 50 and 60 are for performing a reduction with reference to data stored in an LUT, if the quotient calculated in steps 20 and 40 is less than one. Steps 50, 70 and 80 are first enlargement steps for performing an enlargement with reference to data stored in an LUT, if the quotient calculated in steps 20 and 40 is larger than one and the remainder calculated in step 70 is not zero. Steps 50, 70 and 90 are second enlargement steps for performing a second enlargement without reference to an LUT, if the quotient calculated in steps 20 and 40 is larger than zero and the remainder calculated in step 70 is zero. Step 100 is a data writing step for writing enlargement/reduction data calculated via steps 10 to 90 into a memory for use in enlargement/reproduction. Steps 110 and 120 are data verifying steps for verifying if enlargement/reduction data which is read is same as original data and then performing a scan operation.

An operation of device of the present invention can be explained with reference to FIG. 3 to FIG. 11.

First, the basic concept of enlargement/reduction of the present invention can be explained with reference to FIG. 3, as follows. When image data is written into a line memory, as shown in reduction (b) and enlargement (c) of FIG. 3, the writing operation is performed by the sync signal (VCLK) of an input image signal. Then, the image data is enlarged/reduced in the line memory.

Referring to FIG. 4, an LUT for realizing the enlargement/reduction in 1% units is stored in ROM 102, and microprocessor 101 reads the LUT stored in ROM 102 to RAM 103 so as to calculate enlargement/reduction data corresponding to the ratio selected by a user. Then, the calculated enlargement/reduction data is stored in a predetermined area of RAM 103. That is, microprocessor 101 reads out the LUT data from ROM 102 only when the zooming ratio selected by a user needs a reference from LUT, and stores the result into RAM 103. Here, 100 bytes is sufficient for the area of RAM 103 where the LUT is stored.

Assuming a resolution of 400 DPI, the maximum number of pixels for one scanned line is 4,752. Therefore, when enlargement/reduction data corresponding to 4,752 pixels is generated by microprocessor 101 and RAM 103, enlargement/reduction data is read out from RAM 103 and written into zoom RAM 603. At this time, microprocessor 101 does not perform random accessing of the enlargement/reduction data in zoom RAM 603 by employing an address bus, but accesses zoom RAM 603 using an address generated from zoom address counter 605 by a predetermined address allocated in each area of a memory. In addition, enlargement/reduction data can be written in and read from microprocessor 101 via buffer 606.

The above-described operations can be performed when the scan signal of FIG. 5A is low, which corresponds to a zoom data download section. Here, /CS1CLR (FIG. 5) is a signal for aligning an address at zero when data is read/written from/into zoom RAM 603. In addition, /CS1 (FIG. 5I) and /CS1RD (FIG. 5J) are low to read out data from zoom RAM 603, and CS1 (FIG. 5I) and /CS1WR (FIG. 5K) are low to write data into zoom RAM 603. When enlargement/reduction data is written into zoom RAM 603, all preparation for enlargement/reduction is completed. When the scan signal of FIG. 5A is low, image data is not output and first and second line memories 601 and 602 are disabled.

When the scan signal of FIG. 5A is high, the enable signal shown in FIG. 5C is also high and the inverted enable signal shown in FIG. 5D is low, due to the trailing edge of the first pulse of the line sync signal (/LSYNC) of FIG. 5B. Then, when the image data enable signal (/VDEN) shown in FIG. 5E goes low, image data is output by one pixel unit in accordance with the inverted sync signal (/VCLK) shown in FIG. 5F.

At this time, since buffers 608 and 612 are enabled, enlargement/reduction data output from zoom RAM 603 via buffer 608 is provided as an address to first line memory 601. First line memory 601 operates in an image data read-out mode in which the enlarged/reduced image data corresponding to the address output via buffer 612. Here, as an address value of first line memory 601, an output value of zoom address counter 605 is used. Zoom address counter 605 performs counting upon being reset by the line sync signal of FIG. 5B and triggered by the inverted sync signal /VCLK of FIG. 5F. In addition, buffers 609 and 613 are enabled so that an output value of write address counter 604 is applied to an address of second line memory 602 and second line memory 602 operates in an image data write mode in which image data is synchronized with the inverted sync signal /VCLK of FIG. 5F and input to second line memory 602. The above-described operation corresponds to the state 1 of FIG. 5G.

In the meantime, if the second pulse of line sync signal /LSYNC shown in FIG. 5B is input, the enable signal of FIG. 5C is low and the inverted enable signal of FIG. 5D is high. Accordingly, conversely with respect to the state 1, buffers 607 and 611 are enabled and an output value of write address counter 604 is applied to an address of first line memory 601. As a result, first line memory 601 operates in an image data write mode in which image data is synchronized with the inverted sync signal /VCLK of FIG. 5F and input to first line memory 601. Then, buffers 610 and 614 are enabled and enlargement/reduction data output from zoom RAM 603 is applied as an address. As a result, second line memory 602 operates in an image data read-out mode in which the enlarged/reduced data is output via buffer 614. The above-described operation corresponds to the state 2 of FIG. 5G.

First and second line memories 601 and 602 alternately perform the states 1 and 2 in response to the line sync signal /LSYNC of FIG. 5B which is input continuously. When an entire scanning operation is completed, the scan signal of FIG. 5A is low so as to prepare for performing enlargement/reduction and other functions.

An enlargement/reduction method using an LUT can be explained with reference to FIG. 7 to FIG. 11, as follows.

Figure 9:
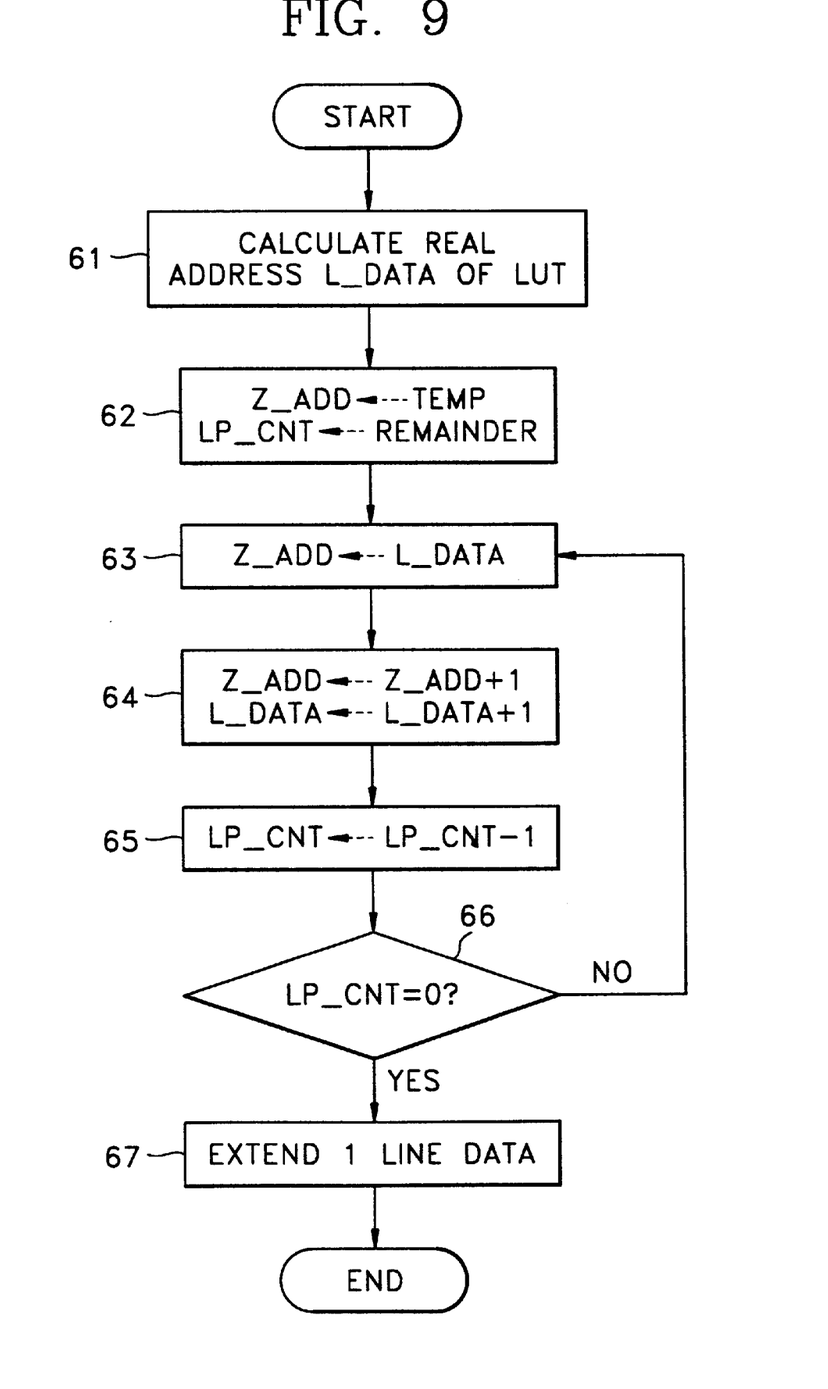
FIG. 9 is a flowchart showing the reduction process of FIG. 7, with reference to the LUT.

Referring to FIG. 7, a standard enlargement/reduction (100%) is performed in step 10 as shown in FIG. 9, and it is determined whether the user specifies a zooming ratio in step 20. If a scan start command is given without setting the zooming ratio in step 20, enlargement/reduction data is written into zoom RAM 603 (step 100). Meanwhile, if step 20 results in a new zooming ratio, the zooming ratio is divided by 100 (step 40) and it is determined whether the quotient is greater than one (step 50).

If the quotient is less than one in step 50, a first reduction process is performed with reference to the LUT as shown in FIG. 9 (step 60). If the quotient is greater than one in step 50, it is determined whether the remainder is zero (step 70).

Figure 10:
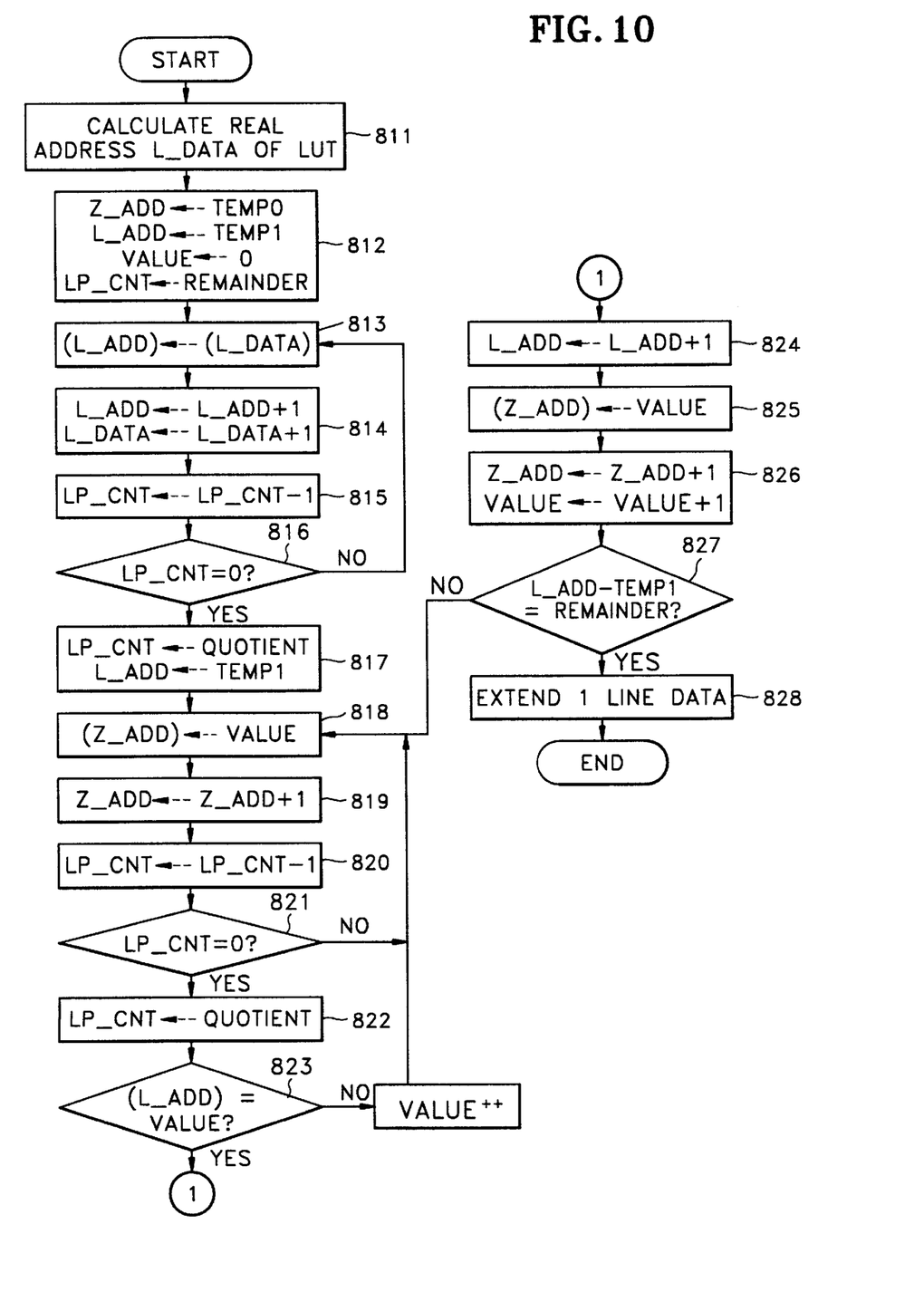
FIG. 10 is a flowchart showing the enlargement process of FIG. 7, with reference to the LUT.
Figure 11:
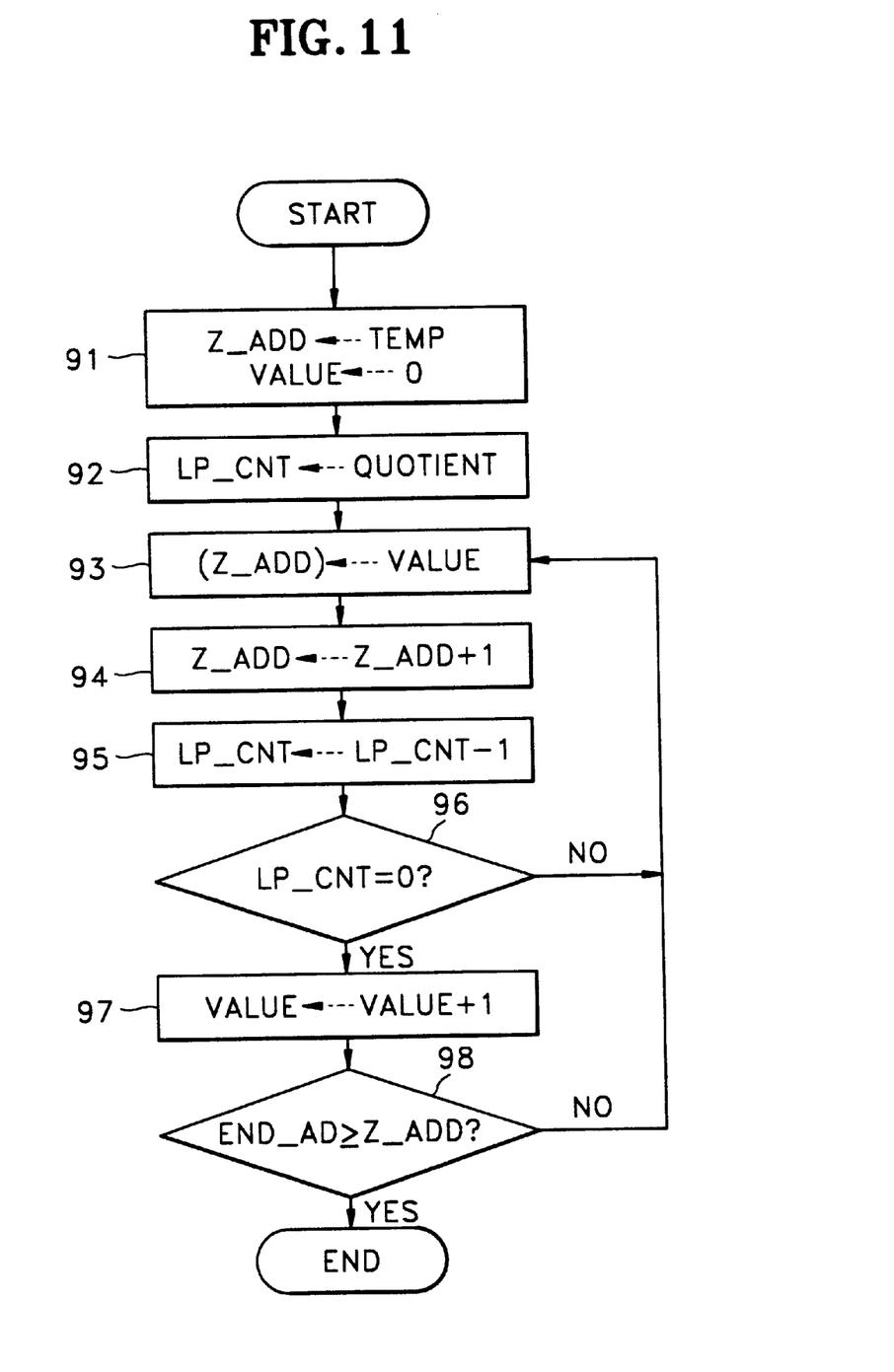
FIG. 11 is a flowchart showing a simplified enlargement process with respect to FIG. 7.

If the remainder is not zero in step 70, a first enlargement process is performed with reference to an LUT as shown in FIG. 10 (step 80). If the remainder is zero, a second enlargement is performed without reference to the LUT as shown in FIG. 11 (step 90).

If enlargement/reduction data is arranged after performing step 90, the enlargement/reduction data is written into zoom RAM 603 (step 100). Then, the data written into zoom RAM 604 is read-out and it is verified whether the read-out data matches the original data (step 110). When the verification is completed, a scan operation is performed (step 120).

Figure 8:
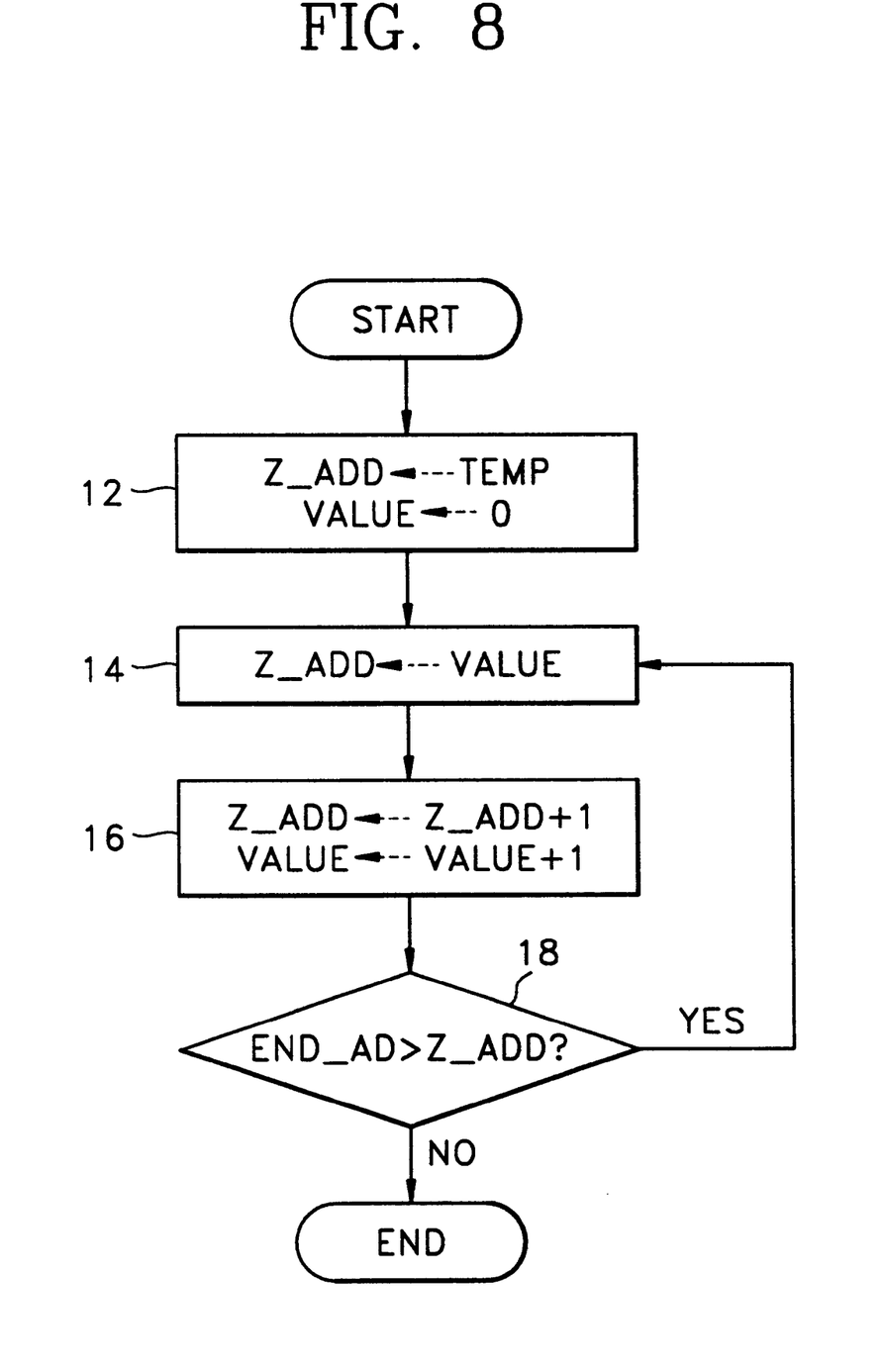
FIG. 8 is a flowchart showing the standard enlargement/reduction process with respect to FIG. 7.

A standard enlargement/reduction can be explained with reference to FIG. 8, as follows. Enlargement/reduction data storing area TEMP in RAM 103 is established in Z_ADD, and reference data VALUE for calculating enlargement/reduction data is established as zero (step 12). Then, the VALUE is written into Z_ADD (step 14) and then, Z_ADD and VALUE are each incremented by one (step 16).

In step 16, the maximum number of pixels END_AD in units of one scanning line in the main scanning direction and Z_ADD are compared. In step 18, if END_AD is equal to or smaller than Z_ADD, the process is finished, and if END_AD is larger than Z_ADD, the steps 14–18 are repeated.

A first reduction process having an LUT as a reference can be explained with reference to FIG. 9, as follows. Referring to FIG. 9, data corresponding to the zooming ratio designated by a user is read out among enlargement/reduction data stored in the LUT, and the read-out data is converted into data in one-line units according to a reduction race, thereby outputting data for performing a reduction.

Real address L_DATA of the LUT stored in ROM 102 is obtained by calculating m(m−1)/2, (here, zoom ratio= 100*n+m, n is quotient and m is remainder) (step 61). And enlargement/reduction data storing area TEMP in RAM 103 is established in Z_ADD, and the remainder calculated by step 40 of FIG. 7 is established in LP_CNT (step 62).

In step 63, value of the LUT is written from L_DATA calculated in step 61 to Z_ADD. Then, L_DATA and Z_ADD are each increased by one (step 64).

In step 65, LP_CNT is decreased by one and the result is compared with zero (step 66). If LP_CNT value is not zero, the process returns to step 63, and if LP_CNT is zero, the data is extended by as much as the maximum number of pixels of one line in the main scan direction corresponding to a reduction rate (step 67). Thus, the operation is finished.

A first enlargement process having an LUT as a reference can be explained with reference to FIG. 10, as follows. Referring to FIG. 10, data corresponding to the zooming ratio designated by a user is read out among enlargement/reduction data is converted stored in the LUT, and converted the read-out data into one-scanning-line data units according to an enlargement rate, thereby outputting data for performing an enlargement.

Real address (L_DATA) of the LUT stored in ROM 102 is calculated by employing the remainder calculated in step 40 of FIG. 7 (step 811). Then, enlargement/reduction data restoring area (TEMPO) in RAM 103 is established in Z_ADD, and a reference data (VALUE) for calculating enlargement/reduction data is established as zero. Then, the remainder calculated in step 40 of FIG. 7 is established in LP_CNT, and temporary area (TEMP1) of RAM 103 where the corresponding LUT data of ROM 102 is established in L_ADD (step 812).

In step 813, the L_DATA calculated in step 811 is written into L_ADD, and L_DATA and L_ADD are each increased by one (step 814).

In step 815, LP_CNT is decreased by one and the result is compared with zero (step 816). If LP_CNT is not zero, the process returns to step 813 so as to repeat the process until the LP_CNT value reaches zero. If LP_CNT is zero, the quotient calculated in step 40 of FIG. 7 is established in LP_CNT and TEMP1 is established in L_ADD (step 817).

In step 818, VALUE is written into Z_ADD and Z_ADD is increased by one (step 819), and LP_CNT is decreased by one (step 820) so as to determine whether the LP_CNT is zero (step 821). If LP_CNT is not zero, the process returns to step 818, and if LP_CNT is zero, the quotient calculated in step 40 of FIG. 7 is established again in LP_CNT (step 822). Then, it is determined whether L_ADD is equal to VALUE (step 823).

In step 824, if L_ADD is not equal to VALUE, the process returns to step 818. If L_ADD is equal to VALUE, L_ADD is increased by one in order to read the next LUT data value (step 824). Then, VALUE is written into Z_ADD (step 825) and $Z_{13}$ ADD 15 increased by one (step 826). Then, it is determined whether the result of subtracting TEMP1 from the current L_ADD is equal to the remainder calculated in step 40 of FIG. 7 (step 827). If the result is different from the remainder, the process returns to step 818. If the result is equal to the remainder, the data is extended by as much as the maximum number of pixels of one line in the main scan direction corresponding to an enlargement rate, by employing the enlargement/reduction data produced thus far (step 828). Thus, the operation is finished.

A second enlargement can be explained with reference to FIG. 11, as follows. Enlargement/reduction data area (TEMP) in RAM 103 is established in Z_ADD, and reference data (VALUE) for calculating enlargement/reduction data is established as zero (step 91). Then, the quotient calculated in step 40 of FIG. 7 is established in LP_CNT (step 92). Then, VALUE is written into Z_ADD (step 93) and the Z_ADD is increased by one (step 94).

In step 95, LP_CNT is decreased by one and the result is compared with zero (step 96). Then, if the result is not zero, the process returns to step 93, and if the result is zero, VALUE is increased by one (step 97). Then, the maximum number in pixels END_AD of an amount equal to one line of data in the main scan direction is compared with Z_ADD (step 98). If END_AD is smaller than Z_ADD, the process returns to step 93, and if END_AD is equal to or larger than Z_ADD, the process is finished.

The enlargement/reduction method explained with reference to the flowcharts shown in FIG. 7 to FIG. 11 can be explained with regards to 85% reduction and 185% enlargement, with reference to the LUT shown in FIG. 6A and FIG. 6B, as follows. Since LUT data from 1% to 99% is sequentially stored in the LUT, the start address where the LUT data corresponding to 85% is stored has to be calculated first. When calculating the address of the LUT is completed, 85 LUT data values are read from the LUT start address corresponding to 85% into enlargement/reduction data storing area TEMP of RAM 103 and the read data is extended to reduction data for an amount equal to one scanning line, since the reduction having an LUT as a reference shown in FIG. 9 employs the LUT data without change.

Meanwhile, in 185% enlargement, the LUT data corresponding to 85% is read in an arbitrary area TEMP1 of RAM 103. Then, the simple enlargement shown in FIG. 11 is performed with respect to 100% enlargement, and the enlargement having the LUT shown in FIG. 10 as a reference is performed with respect to 85% enlargement.

As described above, an image data enlargement/reduction method and circuit of the present invention in a digital image processing system performs enlargement/reduction of image data by employing a small quantity of LUT data, to correspond to a broad range of enlargement/reduction requests by a user and simplify circuit structure. In addition, enlargement/reduction data is calculated by a microprocessor, and zooming ratio can be easily extended in accordance with a software change.

In addition, a more stable enlargement/reduction can be performed since enlargement/reduction is performed via a RAM. Further, if the RAM is replaced by one having a rapid access time, enlargement/reduction can be easily applied for high-speed processing.

Furthermore, enlargement/reduction data is calculated at every point where the zooming ratio is changed and written into the enlargement/reduction RAM. Then, the data is read again and verified so as to prevent a bad copy which may be caused by a malfunction (I/O error) of a memory device. As a result, copy cost can be curtailed and an operation state of hardware can be checked, to thereby recognize an error state.

What is claimed is:

1. An image data enlargement/reduction method in a digital image processing system which comprises a look-up table (LUT) where enlargement/reduction data are stored and a memory for storing processed enlargement/reduction data, and which enlarges/reduces input image data in accordance with a user-designated zooming ratio, the method comprising:

(a) dividing the user-designated zooming ratio by 100 and calculating a quotient and a remainder;

(b) performing a first reduction process reducing image data with reference to the data stored in the LUT if the quotient is less than one;

(c) performing a first enlargement process enlarging image data with reference to the data stored in the LUT if the quotient is greater than one and the remainder is not zero;

(d) performing a second enlargement process, if the quotient is at least one and the remainder is zero; and (e) writing enlargement/reduction data calculated via said steps in (a) to (d) into the memory.

2. The image data enlargement/reduction method according to claim 1, wherein the LUT table stores data for enlargement and reduction operations corresponding to 1% through 99% ratios in steps of 1%.

3. The image data enlargement/reduction method according to claim 1, comprising reading the written enlargement/reduction data and verifying whether the read data is the same as original data.

4. The image data enlargement/reduction method according to claim 1, wherein the first enlargement and reduction process reads the data corresponding to the user-designated zooming ratio from the enlargement/reduction data stored in the LUT, extends the read data into one scanning line of data corresponding to the user-designated zooming ratio, and calculates enlargement/reduction data for the first enlargement/reduction process.

5. An image data enlargement/reduction device for enlarging and reducing image data input to a digital image processing system and for outputting an image corresponding to a user-designated zooming ratio, the device comprising:

a first memory for storing a look-up table (LUT) for use in enlargement/reduction the LUT storing data for enlargement and reduction operations corresponding to 1% through 99% ratios in steps of 1%;

a microprocessor for calculating enlargement/reduction data according to the zooming ratio, using the LUT stored in said first memory;

a second memory for storing the enlargement/reduction data output by said microprocessor; and a third memory for storing enlargement/reduction data extended into one scanning line by said microprocessor, employing the enlargement/reduction data stored in said second memory.

6. The image data enlargement/reduction device according to claim 5, comprising:

first and second line memories for storing the input image data to be enlarged/reduced, in units of one scanned line, respectively, wherein the data in the LUT indicate the addresses of said first and second line memories to be read out.

7. The image data enlargement/reduction device according to claim 6, comprising:

a first counter for counting a sync signal of the image data in order to write the one scanned line units of the image data, into addresses of said first and second line memories.

8. The image data enlargement/reduction device according to claim 7, comprising a second counter for counting a sync signal of the image data in order to output the data stored in said third memory as addresses of said first and second line memories, so that data can be written in said third memory by said microprocessor and so that enlargement/reduction can be performed with respect to the user-designated zooming ratio during a scanning operation.

9. The image data enlargement/reduction device according to claim 6, comprising:

a frequency divider for frequency-dividing a line sync signal such that read and write operations of said first and second line memories are performed alternately.

10. The image data enlargement/reduction device according to claim 6, comprising:

a first buffer for designating a write and read-out address to said first and second line memories;

a second buffer for writing image data to be enlarged/reduced into said first and second line memories;

a third buffer for outputting the enlarged/reduced image data read out from said first and second line memories; and a fourth buffer for said microprocessor to read/write the data of said third memory.

11. The image data enlargement/reduction device according to claim 5 which reads out the data corresponding to the user-designated zooming ratio from the enlargement/reduction data stored in the LUT, extends the read-out data into one scanning line of data according to the enlargement/reduction rate, and calculates enlargement/reduction data for an enlargement/reduction process.

12. The image data enlargement/reduction device according to claim 11, wherein the enlargement/reduction data for the enlargement process is calculated by a second enlargement process with reference to the LUT.

* * * * *